United States Patent

Manor

Patent Number: 5,957,234
Date of Patent: Sep. 28, 1999

[54] COMPRESSED AIR POWERED MOTOR VEHICLE

[76] Inventor: Robert T. Manor, Box 27 N. St., Salamonia, Ind. 47381

[21] Appl. No.: 09/048,515

[22] Filed: Mar. 26, 1998

[51] Int. Cl.[6] .................................................. B60K 9/00
[52] U.S. Cl. ............................................ 180/302; 60/412
[58] Field of Search .................................. 180/305, 306, 180/307, 308, 302, 301; 60/712, 715, 719, 407, 412; 123/198 C

[56] References Cited

U.S. PATENT DOCUMENTS

| | | | |
|---|---|---|---|
| 999,590 | 8/1911 | Priestly . | |
| 3,688,859 | 9/1972 | Hudspeth et al. | 180/66 B |
| 3,847,058 | 11/1974 | Manor | 91/413 |
| 3,980,152 | 9/1976 | Manor | 180/66 B |
| 4,798,053 | 1/1989 | Chang | 180/302 |
| 5,167,292 | 12/1992 | Moiroux et al. | 180/302 |

Primary Examiner—Richard M. Camby
Attorney, Agent, or Firm—Taylor & Associates, P.C.

[57] ABSTRACT

A compressed air powered motor vehicle includes an engine having an intake and an exhaust pipe. The engine is configured for operating on compressed air received in the intake and expelling exhaust air through the exhaust pipe. A compressed air storage container is in fluid communication with the intake of the engine. At least one compression mechanism is in fluid communication with the exhaust pipe of the engine and with the compressed air storage container. The at least one compression mechanism is configured for compressing the exhaust air and replenishing the compressed air storage container. Each compression mechanism includes a reciprocable connecting rod having a direction of travel. A rocker arm has a first end, a second end and a pivot point disposed between the first end and the second end. The first end of the rocker arm is attached to the connecting rod. The rocker arm is configured for pivotal oscillation about the pivot point, thereby reciprocating the rod within the compression mechanism. A bracket interconnects the second end of the rocker arm and the cylinder. The bracket carries the cylinder and moves the cylinder in a direction opposite to the direction of travel of the rod. A stabilizing bar is oriented substantially parallel to the rod and is configured for slidably carrying the bracket.

14 Claims, 2 Drawing Sheets

COMPRESSED AIR POWERED MOTOR VEHICLE

BACKGROUND OF THE INVENTION

1. Field of the Invention

The present invention relates to vehicles, and, more particularly, to a vehicle that operates from gaseous fluid such as air under pressure.

2. Description of the Related Art

An air powered vehicle, having a chassis and wheels, includes an air powered engine mounted on the chassis and having a driving connection with the wheels. A reservoir of gaseous fluid under pressure is connected to an intake system for operating the engine. The air powered engine also includes an exhaust system for expelling still partially compressed exhaust air. Such air powered vehicles are disclosed in U.S. Pat. No. 3,847,058 (Manor) and U.S. Pat. No. 3,980,152 (Manor).

It is known to recompress exhaust air from an air powered engine using a battery operated compressor and return the recompressed air to an air storage tank. A problem is that a conventional 12 volt battery is capable of storing only a very limited amount of power. Although it is possible to recharge the battery using energy from the engine, such recharging involves substantial energy losses and is generally inefficient. Using a great number of batteries to power the compressor is also not practical, as the batteries are expensive and heavy, thereby reducing the overall efficiency of the vehicle.

It is also known to use the relative vertical motion between the chassis and the axle or wheels to recompress the exhaust air using a second type of compressor which is designed to be driven by the vertical motions of the vehicle. A problem is that the additional expense and weight of this second type of air compression system may not be justified, as the energy recoverable from the vertical motions of the vehicle may be very limited, especially on smooth roads.

What is needed in the art is an air powered vehicle in which exhaust air is recompressed using a compression mechanism driven directly by the air powered engine.

SUMMARY OF THE INVENTION

The present invention provides a compressed air powered motor vehicle including an engine which directly drives a compression mechanism for recompressing exhaust air and returning it to a compressed air storage container.

The invention comprises, in one form thereof, a compressed air powered motor vehicle including an engine having an intake and an exhaust pipe. The engine is configured for operating on compressed air received in the intake and expelling exhaust air through the exhaust pipe. A compressed air storage container is in fluid communication with the intake of the engine. At least one compression mechanism is in fluid communication with the exhaust pipe of the engine and with the compressed air storage container. The at least one compression mechanism is configured for compressing the exhaust air and replenishing the compressed air storage container. Each compression mechanism includes a reciprocable connecting rod having a direction of travel. A rocker arm has a first end, a second end and a pivot point disposed between the first end and the second end. The first end of the rocker arm is attached to the connecting rod. The rocker arm is configured for pivotal oscillation about the pivot point, thereby reciprocating the rod within the compression mechanism. A bracket interconnects the second end of the rocker arm and the cylinder. The bracket carries the cylinder and moves the cylinder in a direction opposite to the direction of travel of the rod. A stabilizing bar is oriented substantially parallel to the rod and is configured for slidably carrying the bracket.

An advantage of the present invention is that the output of the engine can be used to directly drive an air compression mechanism, thereby maximizing the overall efficiency of the vehicle.

Another advantage is that batteries are not needed to recompress the exhaust air of the engine.

Yet another advantage is that exhaust air may be recompressed under any road conditions.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
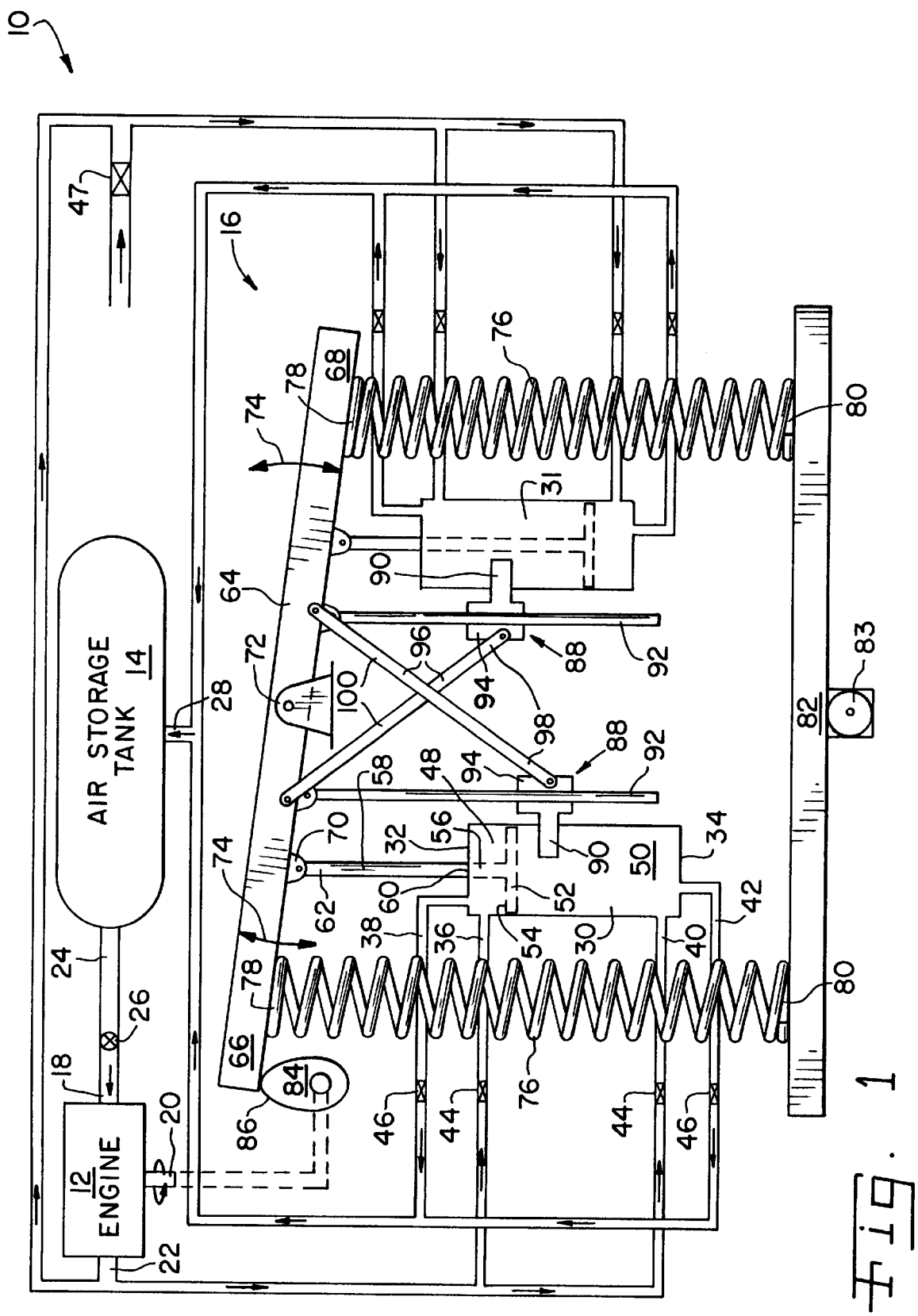
FIG. 1 is a schematic diagram of one embodiment of a compressed air powered motor vehicle of the present invention.

Referring now to the drawings and particularly to FIG. 1, there is shown a compressed air powered motor vehicle 10 including a compressed air powered engine 12, a compressed air storage container 14 and an air compression mechanism 16.

Engine 12 is powered by compressed air received from storage container 14 through an intake 18. Engine 12 converts the energy of the compressed air into a rotation of an output shaft 20. The operation of such an air powered engine is well known and is not discussed in detail herein. Exhaust air, which may be partially compressed as compared to ambient air, is expelled through an exhaust pipe 22.

Air storage tank 14 feeds compressed air into intake 18 of engine 12 through an outlet 24, regulated by a valve 26. Storage tank 14 receives recompressed air through an inlet 28. Storage tank 14 is of a strength so as to contain air at approximately 30 to 500 p.s.i.

Air compression mechanism 16 includes, as shown in FIG. 1, a left-hand cylinder 30 and a right-hand cylinder 31. The two cylinders are substantially identical, and hence only the left-hand cylinder 30 is referred to in detail herein. Cylinder 30 is substantially hollow and has two opposite ends 32 and 34. End 32 has an inlet 36 and an outlet 38, and end 34 has an inlet 40 and an outlet 42. Each of inlets 36 and 40 is in fluid communication with exhaust pipe 22 through a respective one-way check valve 44. Each check valve 44 allows passage of the exhaust air into cylinder 30 while preventing passage of the exhaust air out of cylinder 30. Similarly, each of outlets 38 and 42 is in fluid communication with inlet 28 through a respective one-way check valve 46. Each check valve allows passage of compressed air out of cylinder 30 while preventing passage of the compressed air into cylinder 30. A one-way check valve 47 allows passage of ambient air into check valves 44 in case an adequate supply of air is not available from exhaust pipe 22.

Cylinder 30 includes a first chamber 48 and a second chamber 50 separated by a piston 52. Piston 52 forms a substantially airtight seal between first chamber 48 and second chamber 50. First chamber 48 is in fluid communication with inlet 36 and outlet 38, while second chamber 50 is in fluid communication with inlet 40 and outlet 42. Piston 52 is slidable along a portion of the length of cylinder 30, and maintains, even while sliding, the substantially airtight seal between chambers 48 and 50. A first side 54 of piston 52 is attached to a first end 56 of a connecting rod 58 which extends axially from cylinder 30. Rod 58 is slidable through an orifice 60 in first end 32 of cylinder 30, forming a substantially airtight seal therewith. A second end 62 of rod 58 remains disposed outside of cylinder 30. A rocker arm 64 has two opposite ends 66 and 68, each of which is pivotally connected to a second end 62 of a respective rod 58 through a respective pivot 70. Ends 66 and 68 of rocker arm 64 are separated by a pivot point 72 about which rocker arm 64 may pivot, as indicated by arrows 74. Pivot point 72 can be in the form of a pillow block bearing. A respective suspension spring 76 supports each of ends 66 and 68 of rocker arm 64. One end 78 of each suspension spring 76 is attached to rocker arm 64, while a second end 80 of suspension spring 76 is attached to a fixed structure 82. Fixed structure 82 is shown as being supported by an axle 83.

A non-circular, substantially oval cam 84 is coupled to end 66 of rocker arm 64. End 66 is biased against an outside surface 86 of cam 84 by the attached spring 76 as well as the weight of rocker arm 64. Cam 84 is carried and driven by crank shaft 20 of engine 12.

Each of two brackets 88 interconnects a respective cylinder 30 with a respective opposite end of rocker arm 64. For instance, the left-hand bracket 88 of FIG. 1 interconnects a cylinder 30 to end 68 of rocker arm 64, end 68 being opposite from end 66 of rocker arm 64, to which a cylinder 30 is connected through a rod 58. Brackets 88 each include two arms 90 (only one of which can be seen in FIG. 1) which are rigidly attached to cylinder 30 and enable bracket 88 to movably carry cylinder 30.

Two elongate stabilizer bars 92 are each oriented substantially parallel to a corresponding rod 58, and each stabilizer bar 92 slidably carries a respective bracket 88. Each stabilizer bar 92 is pivotably attached to rocker arm 64. Each bracket 88 includes a body 94 which substantially encloses an associated stabilizer bar 92. It is also possible to provide two helical springs (not shown) surrounding and concentric with each stabilizer bar 92, an end of each spring contacting an opposite end of body 94. The springs can be held fixed on their respective opposite outside ends, thereby spring-loading each body 94 for smoother sliding movement. Each of two connecting bars 96 has opposite ends 98 and 100 which are pivotally connected to a bracket body 94 and an end of rocker arm 64 opposite thereto, respectively.

During use, engine 12 rotates cam 84 through output shaft 20. As cam 84 rotates, end 66 of rocker arm 64 rides on the substantially oval outside surface 86 of cam 84. Rocker arm 64 pivotally oscillates about pivot point 72 as end 66 follows surface 86 of rotating cam 84. The pivotal oscillation of rocker arm 64 causes rod 58 and piston 52 to reciprocate back and forth, piston 52 oscillating up and down within cylinder 30. As end 68 pivots downwardly, opposite end 66 pivots upwardly, pulling the left-hand rod 58 and piston 52 upwardly with it. The connecting bar 96 that is attached to the left-side bracket 88, on the other hand, follows the downward movement of end 68 and carries its bracket 88 and the corresponding cylinder 30 downward, opposite to the direction of travel of its piston 52. Conversely, as end 66 pivots downwardly and pushes left-hand rod 58 and piston 52 down with it, oppositely pivoting end 68 pulls left-side bracket 88 and cylinder 30 upwardly, again opposite to the direction of the corresponding piston 52. Stabilizer bars 92 guide and confine the movement of brackets 88 and cylinders 30, keeping the movement of cylinder 30 substantially parallel to its rod 58.

As piston 52 moves upwardly with respect to its associated cylinder 30, air within first chamber 48 is compressed. When the air pressure within first chamber 48 is greater than the air pressure within storage tank 14, check valve 46 within outlet 38 opens and allows the compressed air to be transferred to storage tank 14. Conversely, as piston 52 moves upwardly, a negative air pressure or vacuum is drawn on second chamber 50, which results in exhaust air being drawn from exhaust pipe 22 through check valve 44 of inlet 40. When piston 52 again moves downwardly with respect to cylinder 30, the air which was previously drawn into second chamber 50 is compressed by piston 52 and pushed out of outlet 42 through check valve 46 to replenish air storage tank 14. During this downward movement of piston 52, exhaust air is drawn into first chamber 48, substantially identically to the way exhaust air was drawn into second chamber 50 as described above. When the air pressure at exhaust pipe 22 exceeds the air pressure within first chamber 48, check valve 44 of inlet 36 opens and allows exhaust air to flow into chamber 48. In this way, compressed air is expelled through outlet 38 on an upstroke, and is expelled through outlet 42 on a downstroke.

In an alternative embodiment (FIG. 2), an air compression mechanism 102 includes a spring lock mechanism 104 which holds end 105 of rocker arm 107 stationary in the event that cam 109 becomes stationary. Spring lock mechanism 104 includes a latch 106 connected to fixed structure 111 by an elongate element 108. A locking spring 110 interconnects latch 106 and end 105 of rocker arm 107 and biases latch 106 against outside surface 113 of cam 109. Latch 106 includes a bottom side 112 which engages a top side 114 of rocker arm end 105 when a longitudinal extension 116 of cam 109 is substantially perpendicular to rocker arm 107. Rocker arm end 105 is thereby clamped between bottom side 112 of latch 106 and cam 109. With no other forces being applied to cam 109, the bias of locking spring 110 is sufficient to pull elongate element 108 against cam 109, thereby holding cam 109 substantially stationary such that its longitudinal extension 116 remains substantially perpendicular to rocker arm 107. In this embodiment, a pivot point 118 can be detachable so that rocker arm end 105 can function as a pivot point about which rocker arm 107 may oscillate. Alternatively, pivot point 118 may be attached to another spring (not shown) such that pivot point 118 may have some vertical movement, allowing end 105 to function as a pivot point for rocker arm 107.

During use, it is possible for cam 109 to no longer be driven by engine 12, e.g., while vehicle 10 is coasting and engine 12 is turned off. In this scenario, the bias of locking spring 110 will pull latch 106 against both end 105 and cam 109, thereby locking longitudinal extension 116 of cam 109 substantially perpendicular to rocker arm 107 and clamping rocker arm end 105 between bottom side 112 of latch 106 and outside surface 113 of cam 109. Road anomalies and the resultant up and down movement of vehicle 10 will cause the free end 120 of rocker arm 107 to oscillate and pivot about the now pivotal end 105 under the stabilizing influence of springs 122. The oscillation of rocker arm 107 causes piston 124 to reciprocate within cylinder 126, thereby compressing air as described above in the previous embodiment. When cam 109 is again driven by engine 12, the bias of locking spring 110 is overcome. Cam 109 again begins to rotate and pushes rocker arm end 105 in the same pivotal oscillation as described above. When longitudinal extension 116 of cam 109 is substantially parallel to rocker arm 107, latch 106 is pushed away from rocker arm end 105 so that the two are no longer in contact.

Figure 2:
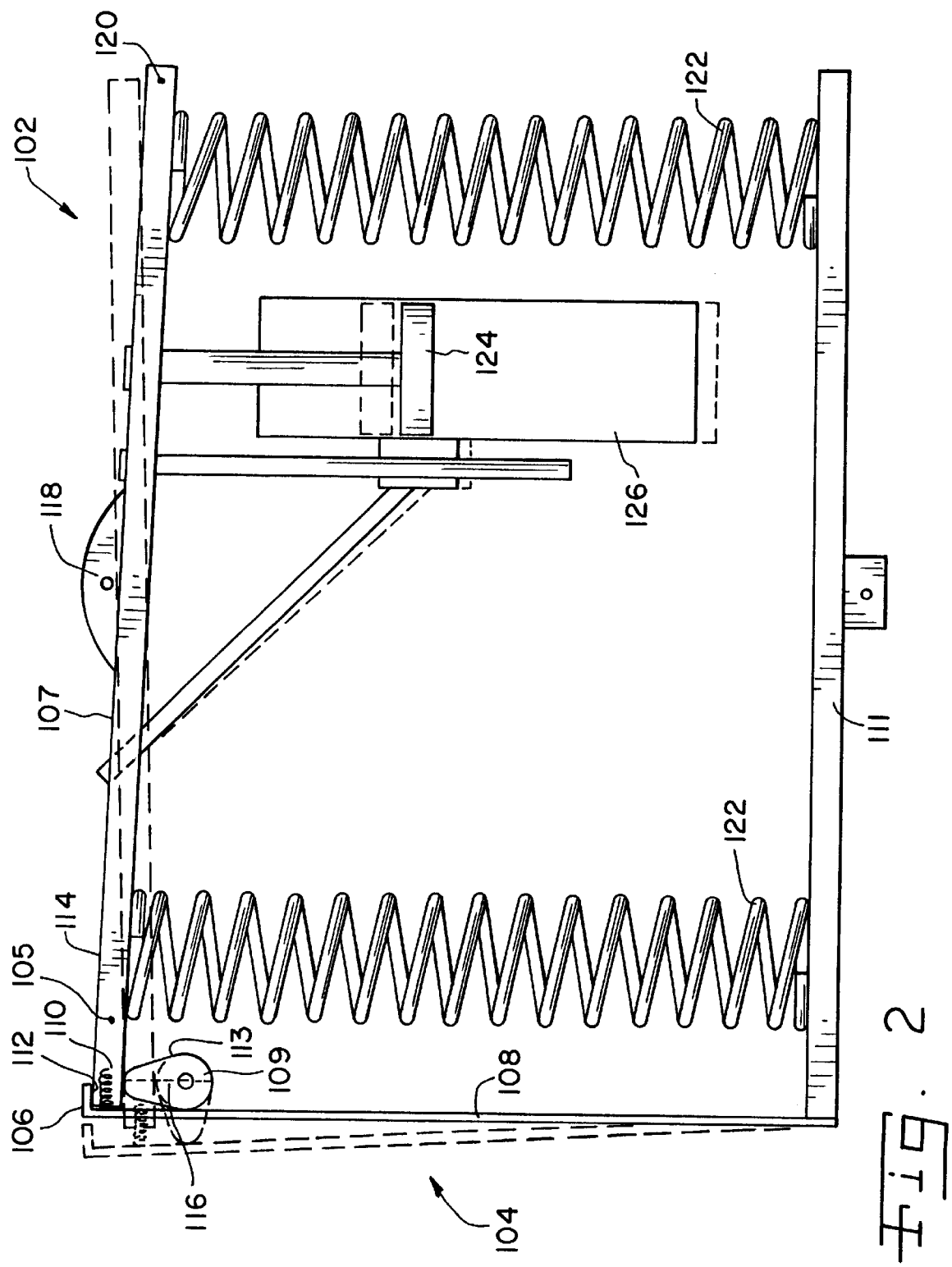
FIG. 2 is a schematic diagram of another embodiment of the compression mechanism of the compressed air powered motor vehicle of FIG. 1.

It is possible in either of the embodiments of FIGS. 1 and 2 for the cam to be driven by an energy source other than engine 12, such as an electrically driven motor (not shown). In this case too, spring lock mechanism 104 can be used to hold rocker arm end 105 stationary when the alternative force that drives cam 109 is disabled.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A compressed air powered motor vehicle, comprising:
    an engine including an intake and an exhaust pipe, said engine being configured for operating on compressed air received in said intake and expelling exhaust air through said exhaust pipe;
    a compressed air storage container in fluid communication with said intake of said engine;
    at least one compression mechanism configured for compressing the exhaust air, each said compression mechanism including:
        a substantially hollow cylinder having at least two inlets in fluid communication with said exhaust pipe of said engine, each said inlet including a first check valve allowing passage of the exhaust air into said cylinder while preventing passage of the exhaust air out of said cylinder, said cylinder also having at least two outlets in fluid communication with said compressed air storage container, each said outlet including a second check valve allowing passage of the compressed air out of said cylinder while preventing passage of the compressed air into said cylinder;
        a piston slidably disposed within said cylinder, said piston forming a substantially airtight seal with said cylinder, said piston having a first side and a second side, said cylinder and said first side of said piston defining a first chamber, said cylinder and said second side of said piston defining a second chamber, each said chamber being associated with at least one said inlet and at least one said outlet; and
        a rod extending axially from said cylinder, said rod having a first end attached to said first side of said piston and a second end disposed outside said cylinder, said rod being slidable relative to said cylinder;
    a rocker arm having a first end, a second end and a pivot point disposed between said first end and said second end, said first end of said rocker arm being attached to said second end of said rod of a first said compression mechanism, said rocker arm being configured for pivotal oscillation about said pivot point, thereby reciprocating said rod and said piston within said cylinder; and
    a cam coupled with one of said first end and said second end of said rocker arm, said cam being configured for pivotal oscillation of said rocker arm.

2. The compressed air powered motor vehicle of claim 1, wherein said piston has a direction of travel, said motor vehicle further comprising a bracket interconnecting said second end of said rocker arm and said cylinder of a first said compression mechanism, said bracket carrying said cylinder and moving said cylinder in a direction opposite to said direction of travel of said piston.

3. The compressed air powered motor vehicle of claim 2, further comprising a stabilizer bar oriented substantially parallel to said rod, said stabilizer bar slidably carrying said bracket.

4. The compressed air powered motor vehicle of claim 1, further comprising a fixed structure and at least one suspension spring having two opposite ends, a first said end of each said suspension spring being attached to a respective said end of said rocker arm, a second said end of each said suspension spring being attached to said fixed structure, said at least one suspension spring being configured for limiting said pivotal oscillation of said rocker arm.

5. The compressed air powered motor vehicle of claim 1, wherein each said chamber is associated with a single respective said inlet and a single respective said outlet.

6. The compressed air powered motor vehicle of claim 1, wherein said air powered engine includes an output shaft driving said cam.

7. The compressed air powered motor vehicle of claim 1, wherein said at least one compression mechanism is configured for expelling the compressed air through at least one of said outlets on each of an upstroke and a downstroke.

8. The compressed air powered motor vehicle of claim 1, wherein said cam is coupled with said second end of said rocker arm, said compressed air powered motor vehicle further comprising a spring lock mechanism configured for holding stationary said second end of said rocker arm when said cam is stationary.

9. The compressed air powered motor vehicle of claim 8, further comprising a fixed structure, and wherein said spring lock mechanism includes a latch attached to said fixed structure and configured for engaging said second end of said rocker arm, said spring lock mechanism also including a resilient device configured for biasing said latch against said second end of said rocker arm.

10. The compressed air powered motor vehicle of claim 9, wherein said resilient device comprises a locking spring interconnecting said latch and said second end of said rocker arm.

11. The compressed air powered motor vehicle of claim 9, wherein said cam has a longitudinal extension, said latch engaging said second end of said rocker arm when said longitudinal extension of said cam is oriented substantially perpendicular to said rocker arm, said cam being configured for biasing said latch away from said second end of said rocker arm when said longitudinal extension of said cam is oriented substantially parallel to said rocker arm.

12. The compressed air powered motor vehicle of claim 1, wherein said second end of said rocker arm is attached to said second end of said rod of a second said compression mechanism.

13. The compressed air powered motor vehicle of claim 1, further comprising a third check valve in fluid communication with said at least two inlets of said cylinder, said third check valve allowing passage of air from an ambient environment into said at least two inlets while preventing passage of air from said at least two inlets into said ambient environment.

14. A compressed air powered motor vehicle, comprising:

an engine including an intake and an exhaust pipe, said engine being configured for operating on compressed air received in said intake and expelling exhaust air through said exhaust pipe;

a compressed air storage container in fluid communication with said intake of said engine;

at least one compression mechanism in fluid communication with said exhaust pipe of said engine and with said compressed air storage container, said at least one compression mechanism being configured for compressing the exhaust air and replenishing said compressed air storage container, each said compression mechanism including a reciprocable connecting rod having a direction of travel;

a rocker arm having a first end, a second end and a pivot point disposed between said first end and said second end, said first end of said rocker arm being attached to said connecting rod, said rocker arm being configured for pivotal oscillation about said pivot point, thereby reciprocating said rod within said compression mechanism;

a bracket interconnecting said second end of said rocker arm and said cylinder, said bracket carrying said cylinder and moving said cylinder in a direction opposite to said direction of travel of said rod; and a stabilizing bar oriented substantially parallel to said rod, said stabilizing bar being configured for slidably carrying said bracket.

* * * * *